US012081445B2

(12) United States Patent
Augé et al.

(10) Patent No.: US 12,081,445 B2
(45) Date of Patent: Sep. 3, 2024

(54) NETWORK INTERFACE SELECTION BASED ON APPLICATION PROFILES

(71) Applicant: Cisco Technology, Inc., San Jose, CA (US)

(72) Inventors: Jordan François Jean Augé, Saint-Cyr-I-Ecole (FR); Giulio Grassi, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/670,637

(22) Filed: Feb. 14, 2022

(65) Prior Publication Data

US 2023/0262002 A1 Aug. 17, 2023

(51) Int. Cl.
*H04L 45/00* (2022.01)
*H04L 43/12* (2022.01)
*H04L 47/20* (2022.01)
*H04L 47/2475* (2022.01)

(52) U.S. Cl.
CPC .......... *H04L 47/2475* (2013.01); *H04L 43/12* (2013.01); *H04L 47/20* (2013.01)

(58) Field of Classification Search
CPC ...... H04L 47/2475; H04L 43/12; H04L 47/20
See application file for complete search history.

(56) References Cited

U.S. PATENT DOCUMENTS

| 10,455,462 | B1 | 10/2019 | Desai et al. |
| 10,812,995 | B2 | 10/2020 | Chu et al. |
| 2006/0084417 | A1 | 4/2006 | Melpignano et al. |
| 2014/0369329 | A1 | 12/2014 | Lee et al. |
| 2016/0094427 | A1* | 3/2016 | Talat ....................... H04L 69/16 709/250 |
| 2017/0244633 | A1* | 8/2017 | Krishnan ................ H04L 45/56 |
| 2017/0244777 | A1* | 8/2017 | Ouyang ................... H04L 43/08 |
| 2018/0227223 | A1* | 8/2018 | Hughes .................... H04L 69/22 |
| 2019/0007270 | A1* | 1/2019 | Suragi Math ........... H04L 47/24 |
| 2020/0045131 | A1* | 2/2020 | Nigam ..................... H04L 67/54 |
| 2020/0229075 | A1 | 7/2020 | Andreoli-Fang et al. |
| 2020/0336398 | A1* | 10/2020 | Thomas .............. H04L 43/0876 |
| 2020/0382387 | A1* | 12/2020 | Pasupathy ........... H04L 41/5019 |

(Continued)

OTHER PUBLICATIONS

Pluntke, et al. "Saving Mobile Device Energy with Multipath TCP", MobiArch '11, Proceedings of the sixth international workshop on MobiArch, Jun. 2011, pp. 1-6, Association for Computing Machinery, Bethesda, MD.

(Continued)

*Primary Examiner* — Christopher B Robinson
(74) *Attorney, Agent, or Firm* — BEHMKE INNOVATION GROUP LLC; James M. Behmke; James J. Wong (57) ABSTRACT

In one embodiment, an agent executed by a device receives a profile for an application executed by the endpoint device that specifies one or more flow treatment policies for the application. The agent obtains performance metrics regarding a plurality of network interfaces of the endpoint device. The agent selects a particular network interface of the plurality of network interfaces by comparing the profile for the application to the performance metrics. The agent sends a packet for an application flow of the application over the particular network interface.

14 Claims, 10 Drawing Sheets

(56) References Cited

U.S. PATENT DOCUMENTS

2021/0168068 A1* 6/2021 Shenoy .................. H04L 43/08
2022/0124588 A1* 4/2022 Zhu .................. H04W 28/0236

OTHER PUBLICATIONS

Shi, et al., "An Application-Oriented Cooperative Vertical Handoff Decision Method for Multi-Interface Mobile Terminals", 7th International Conference on ITS Telecommunications, Jun. 2007, 5 pages, IEEE, Sophia Antipolis, France.

* cited by examiner

NETWORK INTERFACE SELECTION BASED ON APPLICATION PROFILES

TECHNICAL FIELD

The present disclosure relates generally to computer networks, and, more particularly, to network interface selection based on application profiles.

BACKGROUND

Endpoint devices, like cellphones, tablets, etc., are increasingly being equipped with multiple network interfaces, for example, Wi-Fi interfaces, cellular modems, etc. Conventionally, from the perspective of a given endpoint device, deciding when and how to use a particular network interface over another interface presents many challenges. These challenges are oftentimes addressed using traditional network monitoring approaches, for example, Quality of Service (QoS). Changes in network quality are measured and detected using QoS, which sometimes do not map onto changes in perceived opinions of usability of a given application executing on an endpoint device.

DESCRIPTION OF EXAMPLE EMBODIMENTS

Overview

According to one or more embodiments of the disclosure, an agent executed by a device receives a profile for an application executed by the endpoint device that specifies one or more flow treatment policies for the application. The agent obtains performance metrics regarding a plurality of network interfaces of the endpoint device. The agent selects a particular network interface of the plurality of network interfaces by comparing the profile for the application to the performance metrics. The agent sends a packet for an application flow of the application over the particular network interface.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
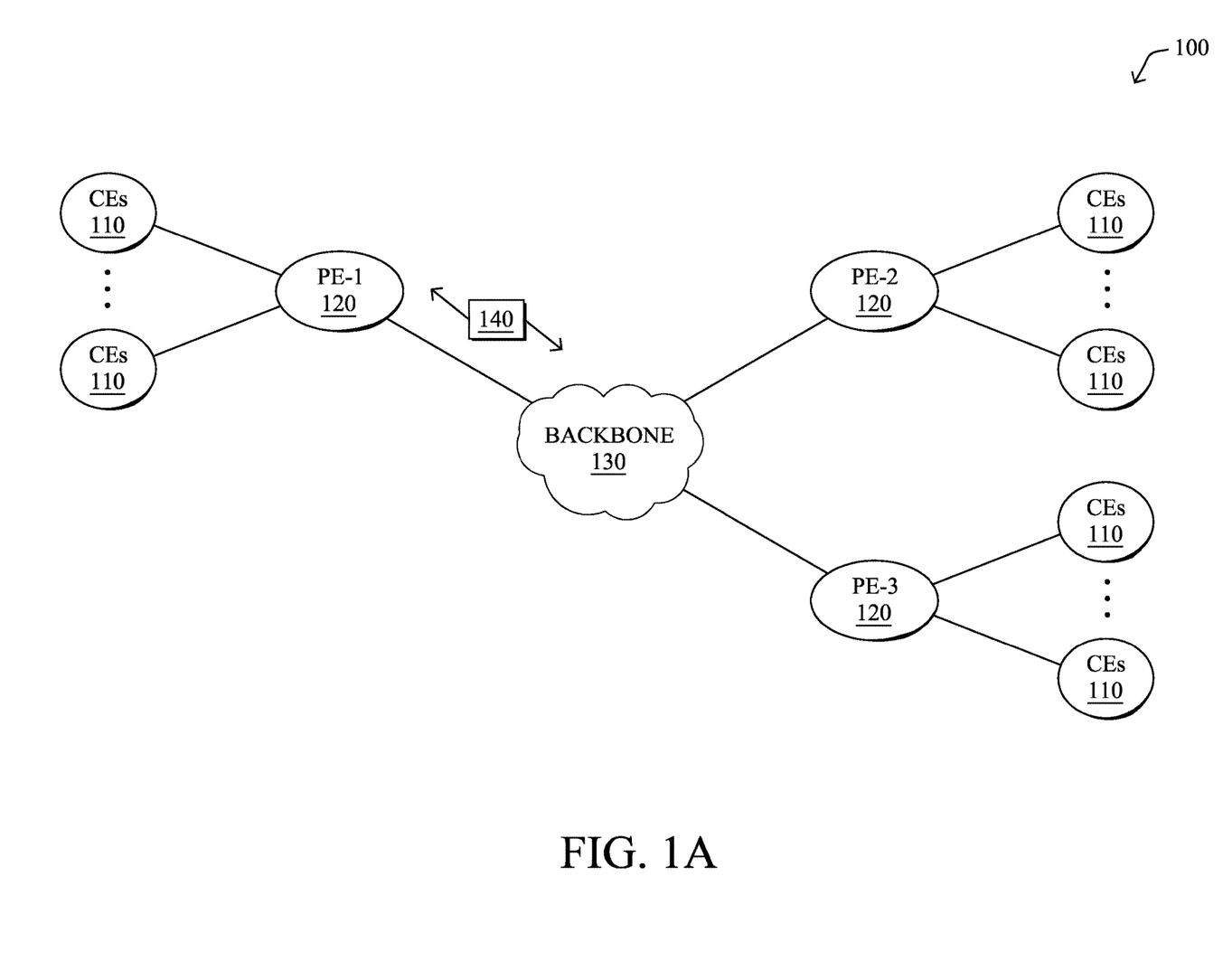
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
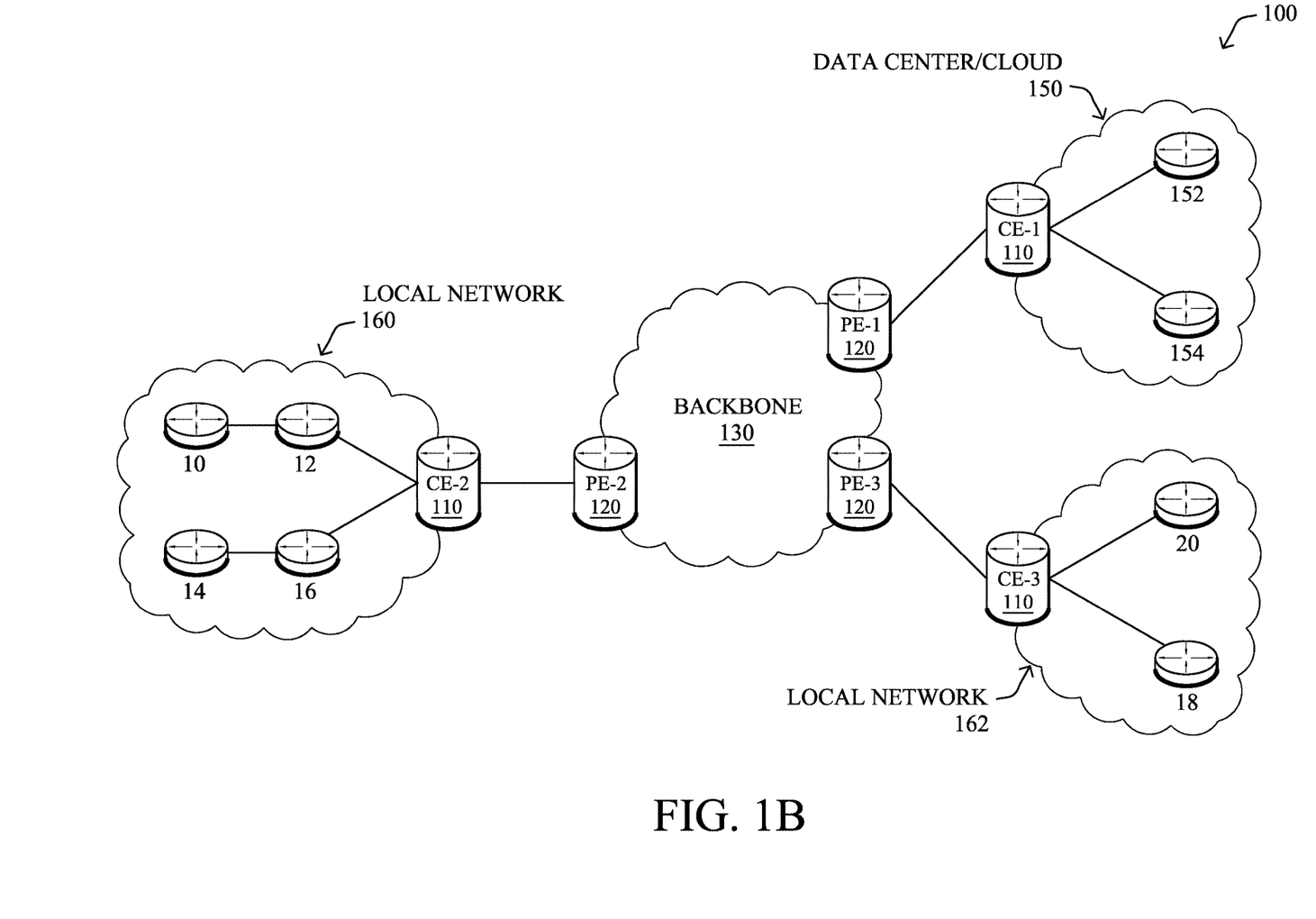

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
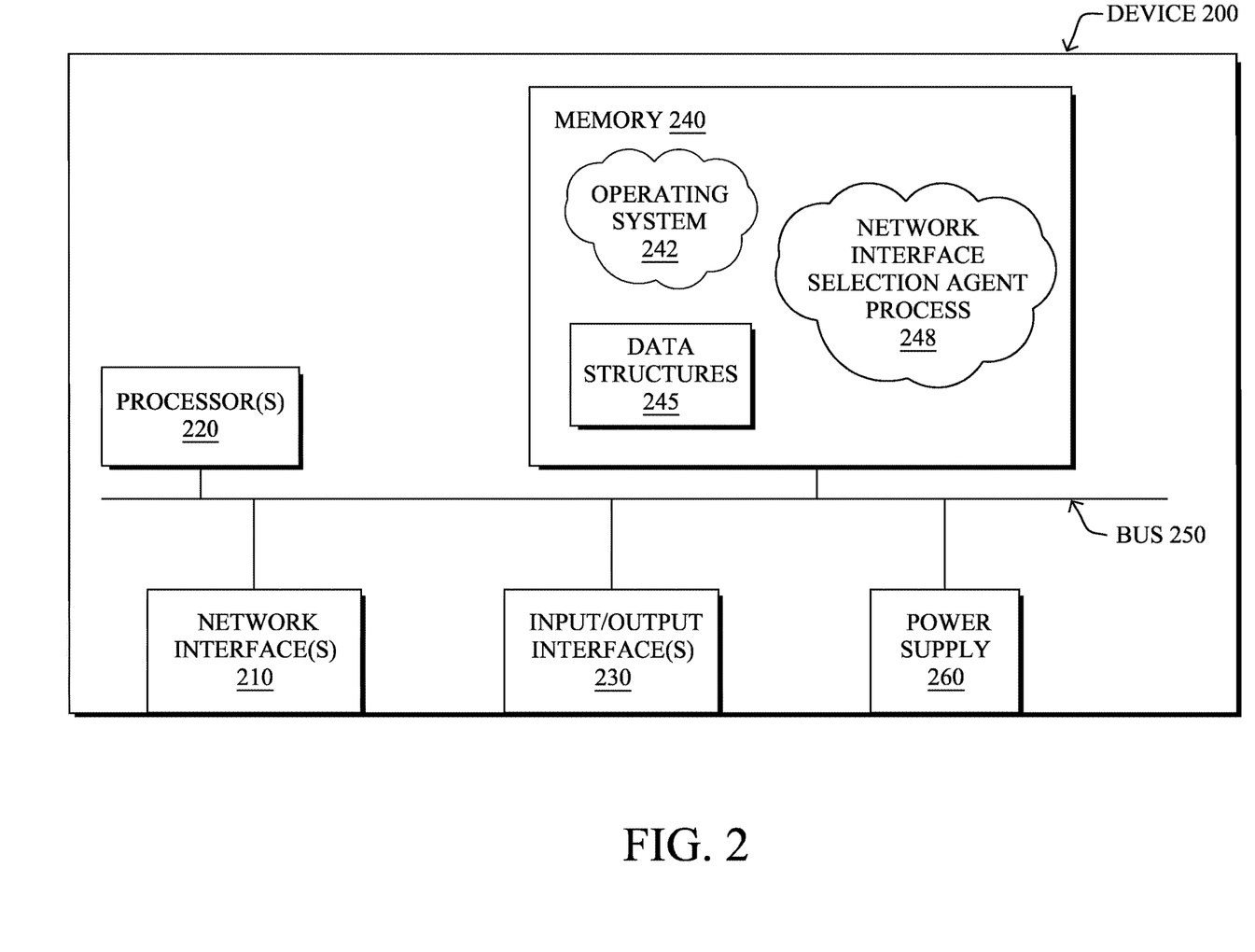
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, physical network interfaces 210 may also be used to implement one or more virtual network interfaces, such as for virtual private network (VPN) access, known to those skilled in the art. As is understood in the art, network interfaces 210 may comprise a plurality of network interfaces used for a variety of networking communication protocols, for example, Wi-Fi, cellular (LTE, 5G, etc.), Bluetooth, etc.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise network interface selection agent process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Generally, a given mobile device (e.g., cellphone, tablet, laptop, etc.) may send out a plurality of packet (or network) flows from a plurality of different applications that execute on the device. These flows travel a network path from the device through a plurality of networking devices (e.g., routers, switches, telecommunications hardware, etc.) to a destination, where the destination may perform an action, return information/data, etc. Conventionally, measuring the performance of network paths is done in terms of Quality of Service (QoS), which may be understood as a collection of measurements that indicate how well a given network path is performing at a networking device level. These measurements include packet loss, bit rate, throughput, transmission delay, availability, jitter, etc. However, QoS measurements and optimizations based on them might not directly correlate to an increase in end-user quality expectations for a given application (i.e., Quality of Experience (QoE)). That is, QoE may be understood as referring to the subjective assessment of an application experience from the standpoint of a user of the application. QoE may be measured within the application itself, for example, using intra-application ratings of an application (e.g., a session of videoconference application may be rated from zero to five). In another example, QoE of a given application executing on a device may be measure by another application of the device. QoE may also be measured using a side channel such as satisfaction surveys via email, text message, etc. In the aggregate, QoE-type ratings may be indicated by a mean opinion score.

Traditionally, QoS has been used as a proxy for QoE. For example, QoS measurements may be compared to one or more service level agreements (SLAs), where a given SLA, as is understood in the art, may include a plurality of minimum requirements for a measured network quality metric, guarantees of service, etc. When using QoS as a proxy for QoE, for example, QoS measurements may be compared to an SLA and, if requirements of the SLA are met, then it is assumed that an end user's experience of the application is "good." However, it has become increasingly evident that there are many scenarios where QoS analysis of network paths does not map to QoE assessments of a user's experience. For example, QoS metrics for a web browser application on a device may indicate that that the application is not meeting SLA requirements, but an end user's subjective experience, in terms of QoE, may still be "good." On the other hand, there are cases, where QoS metrics for a videoconference application indicate that the application is meeting SLA requirements, but an end user's QoE of the application may be "bad."

As noted above, endpoint devices, like cellphones, tablets, etc., are increasingly being equipped with multiple network interfaces, for example, Wi-Fi, cellular (LTE, 5g, etc.), etc. Conventionally, from the perspective of a given endpoint device, deciding when and how to use a particular network interface presents many challenges, notably with respect to QoE (in addition to QoS). In terms of maximizing QoE, as described above, this is difficult in that changes in network quality often do not map onto changes in perceived opinions of QoE. Even more, monitoring network quality oftentimes requires looking at disparate sets of performance information (e.g., layer-2 hardware/software performance, radiofrequency conditions, layer-3 hardware/software performance, etc.). In order to maximize QoE, the "most" optimal path, which includes a given network interface for an application (executing on an endpoint device) depends on time as well as requirements of the application itself. One other consideration is battery consumption, as many endpoint devices operate with limited battery life. So, reducing battery consumption persistently remains as an objective when, for example, switching between network interfaces, monitoring network quality (including, deciding which interface to monitor), etc.

There have been a number of solutions that address deciding handoffs and usage of endpoint devices that usually comprise both Wi-Fi and cellular communications functions; though these are mostly done in terms of assessing QoS. Generally, these solutions operate under the assumption that cellular (e.g., LTE) coverage is better and more reliable than Wi-Fi. In addition, handoffs in the vertical sense (i.e., from LTE to Wi-Fi) are not a per-application basis, so these solutions present limited control and/or cost optimization in interface selection. In sum, many of these solutions merely handover all of an endpoint device's network communications when LTE fails, over to Wi-Fi, without considering QoE.

Network Interface Selection Based On Application Profiles

The techniques herein, therefore, allow an endpoint device to select an optimal interface (e.g., LTE or Wi-Fi) for on a per-application basis in a dynamic fashion. In particular, one or more applications executing on a mobile device may be configured to define its own requirements in terms of QoS or QoE. Alternatively, one or more profiles may be established that define QoS and/or QoE requirements of an application. Based on the requirements of an application and monitored performance of network interfaces available on the endpoint device, a particular interface may be selected and used for a given packet/network flow of the application. It is contemplated that in multipath scenarios, the application may be configured to select more than one interface. Performance of each of the interfaces may be gathered by an agent installed on the end point device, where the agent is configured to passively and/or actively monitor and gather layer-2 and layer-3 networking statistics of interfaces of the endpoint device. Such gathering of networking statistics may be done using a probing scheme that provides for up-to-date statistics regarding the networking interfaces, while limiting battery loss. In addition, the agent may be configured to compare the performance of the interfaces to requirements of a particular application, then select one of the interfaces. Specifically, it is contemplated that an application may define (or a flow profile may indicate) that the application requires low delay, additional bandwidth, more reliable service, etc.

Specifically, according to one or more embodiments of the disclosure as described in detail below, an agent executed by a device receives a profile for an application executed by the endpoint device that specifies one or more flow treatment policies for the application. The agent obtains performance metrics regarding a plurality of network interfaces of the endpoint device. The agent selects a particular network interface of the plurality of network interfaces by comparing the profile for the application to the performance metrics. The agent sends a packet for an application flow of the application over the particular network interface.

Illustratively, the techniques described herein may be performed by hardware, software, and/or firmware, such as in accordance with network interface selection agent process 248, which may include computer executable instructions executed by the processor 220 (or independent processor of interfaces 210) to perform functions relating to the techniques described herein.

Figure 3:
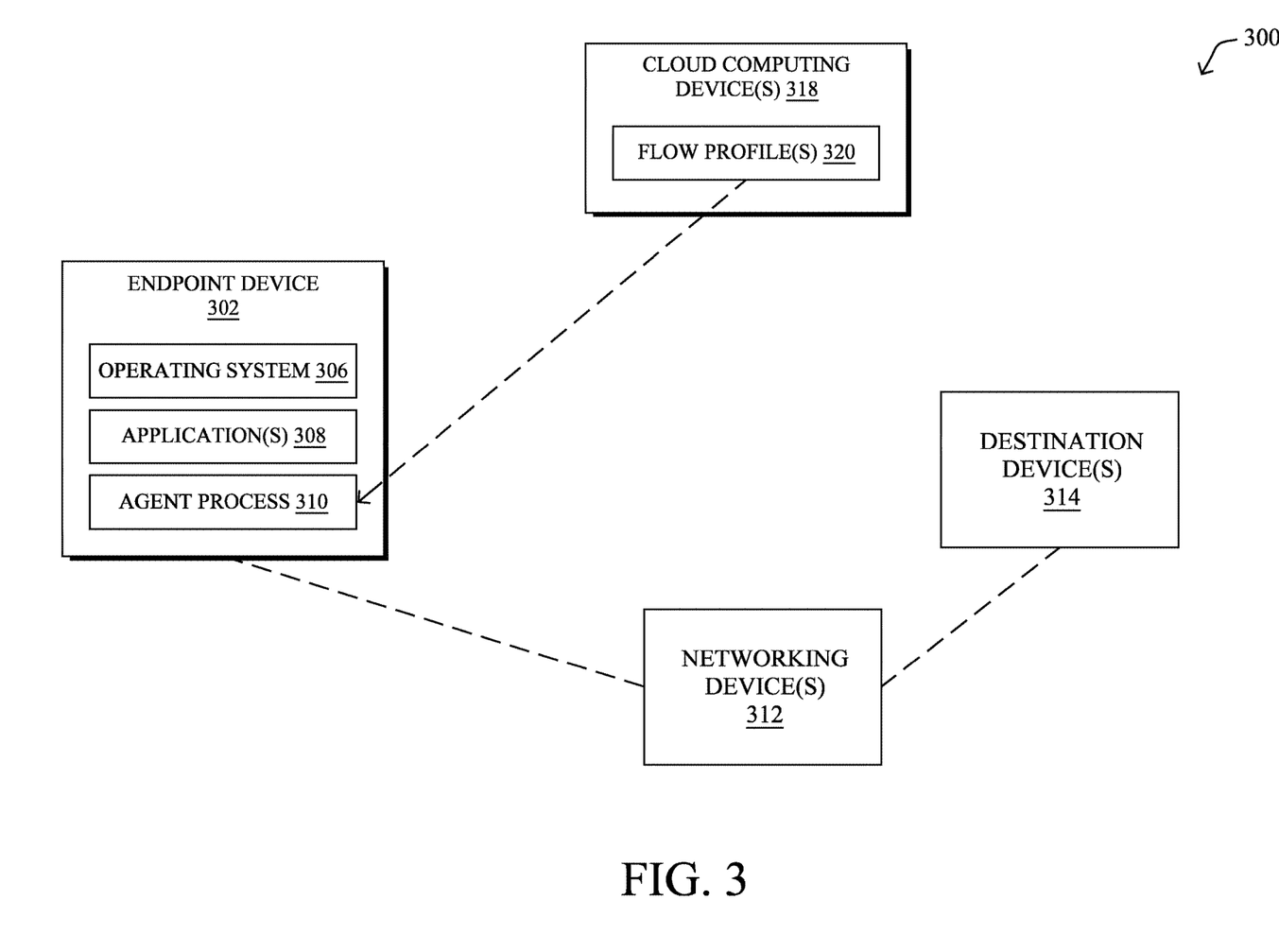
FIG. 3 illustrates an example architecture for network interface selection based on application profiles.

Operationally, FIG. 3 illustrates an example architecture for to network interface selection based on application profiles, where architecture 300 may include an endpoint device 302 and a destination device 304. Endpoint device 302 may comprise any end user computing device which a user may use to communicate with destination device 304, for example, a mobile device such as a cellphone, tablet, laptop, cellphone, etc. Endpoint device 302, as shown, may comprise operating system 306, application(s) 308, and agent 310 that are local to endpoint device 302.

Of note, operating system 306 may be configured as described above with respect to operating system 242 of FIG. 2, where operating system 306 may manage the network communications, input/output, etc. of endpoint device 302. Further, agent 310 may be implemented through the execution of network interface selection agent process 248. Application(s) 308 of endpoint device 302 may comprise applications that may be executed on endpoint device 302 (along with operating system 306), for example, a video-conference application, a multimedia application, a gaming application, etc. that communicate one or more network flows which travel over paths comprising networking device(s) 312 to destination device(s) 314. It is to be understood that each of these applications may send out various network flows that each require varying degrees of prioritization, treatment, etc. Generally, destination device(s) 314 may comprise computing resources, data storage, etc. that application(s) 308 may access or use during execution. Furthermore, in an embodiment, it is contemplated that application(s) 308 may comprise a native application to the endpoint device 302 that communicates with a networking stack (e.g., of operating system 306). In this embodiment, the native application may be configured itself to operate as agent 310.

In addition, architecture 300 comprises cloud computing device(s) 316 that, as shown in FIG. 3, is configured to store one or more flow profiles 320 that may be defined and specified by end users, managers/stakeholders, etc. of application(s) 308. One or more flow profiles 320 may be unique to a particular application and include one or more flow treatment policies for network flow, traffic, packets, etc. generated (or caused to be generated) by the application that reflect various QoE enhancements desired for a given function of the application. Specifically, a particular profile for an application may define how various network traffic output by the application is to be treated and the particular profile may further define particular performance requirements for various flows/functions of the application. The particular profile may specify QoS-type requirements like bandwidth, loss rate, latency, packet delay, etc. and/or QoE-based requirements, such as video frames per-second, image resolution preferences, etc. In addition, the particular profile may include various weightings that are applied to different QoS and/or QoE requirements, where a weighting indicates relative importance of a given requirement (over other requirements). For instance, a profile for a gaming application may require that data related to a user's gaming experience is prioritized for as soon as possible delivery service, while data related to chat/text messages is de-prioritized. It is contemplated that in the agent 310 may be configured to translate QoE-type requirements found in a flow profile into QoS-type requirements, based on, for example, heuristics, machine learning-based approaches, end user configured logic, etc.

Agent 310 is configured to retrieve profile mappings of one or more flow profiles 320 subsequent to the profiles being defined. Furthermore, it is contemplated that the functions provided by agent 310, in some embodiments, may be performed off-site from endpoint device 302, for example, at cloud computing device(s) device(s) 316.

Turning to FIGS. 4A-4E, additional details of an example device for network interface selection based on application profiles are shown. In particular, out of application(s) 308 that endpoint device 302 may be executing, it may comprise first application 402, second application 404, and third application 406. For example, each of these applications may be a web browser application, an email client, a gaming application, a chat application, a teleconference application, etc. Agent 310 may for each of the applications be configured to store a corresponding flow profile for these applications, where first profile 408 corresponds to first application 402, second profile 410 corresponds to second application 404, and third profile 412 corresponds to third application 406. In addition, endpoint device 302 is configured to comprise first networking interface 414 and a Nth network interface 416, where first networking interface 414 may be a cellular-based communications interface and Nth network interface 416 is a Wi-Fi communication based interface. As understood in the art, endpoint device 302 may be configured to rely, for example, first networking interface 414 as a primary communications interface and "switch" to Nth network interface 416 when it is down.

Figure 4A:
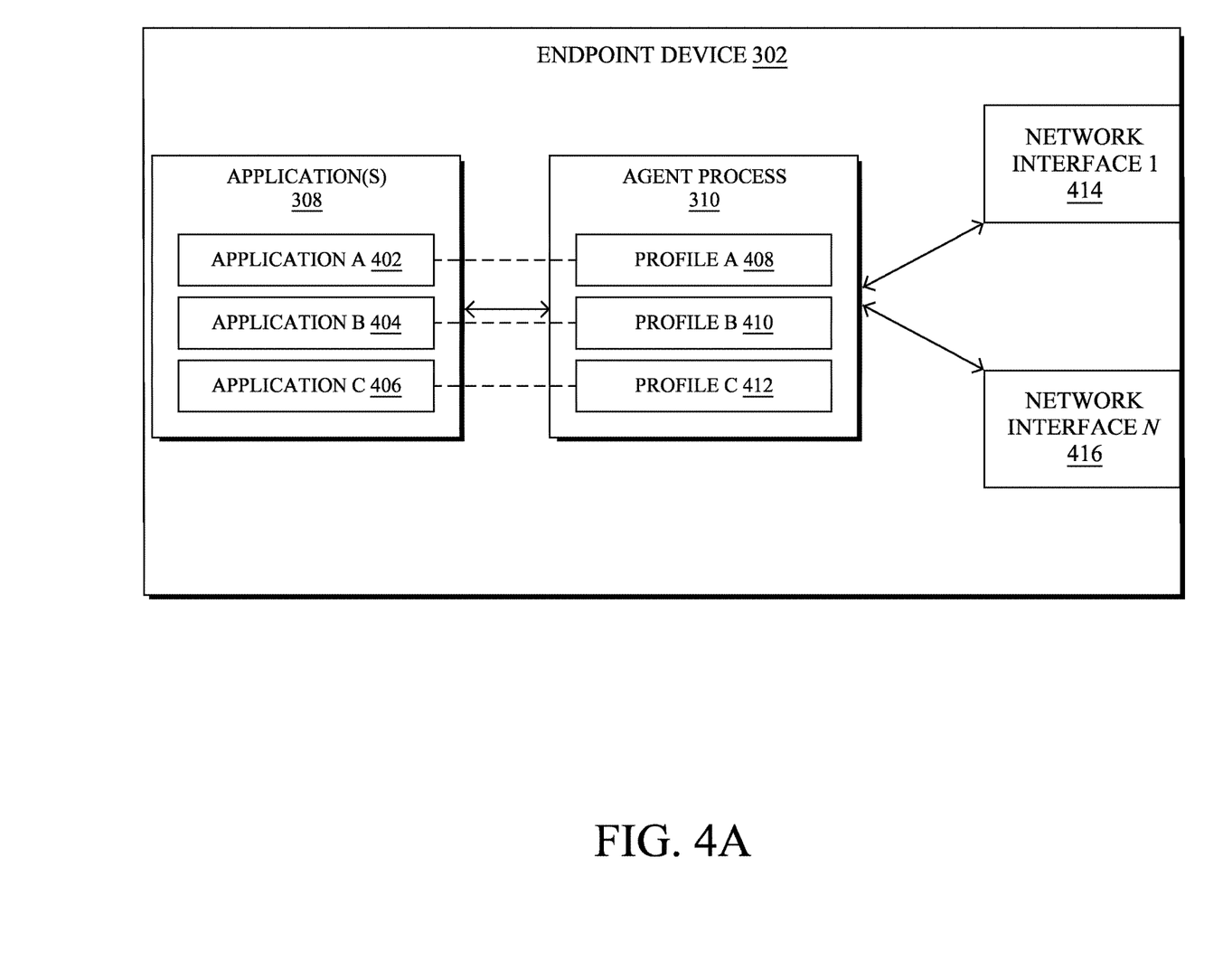
FIGS. 4A-4E illustrates additional details of an example device for network interface selection based on application profiles.

However, as will be described in greater detail herein, agent 310 in combination with application(s) 308 may be configured to, at a per-application or per-network flow (of a given application), select which flows are to be sent using a particular network interface. It is generally contemplated that agent 310 may be configured to perform a network interface exploration process, where such process may include discovery, credential sharing, access, etc. for each of the network interfaces. Additionally, agent 310 may monitor the network interfaces by gathering performance metrics for each of the network interfaces. In an embodiment, it is contemplated that agent 310 may be configured to retrieve a corresponding profile for a given application in response to determining that the application has been installed on endpoint device 302.

Figure 4B:
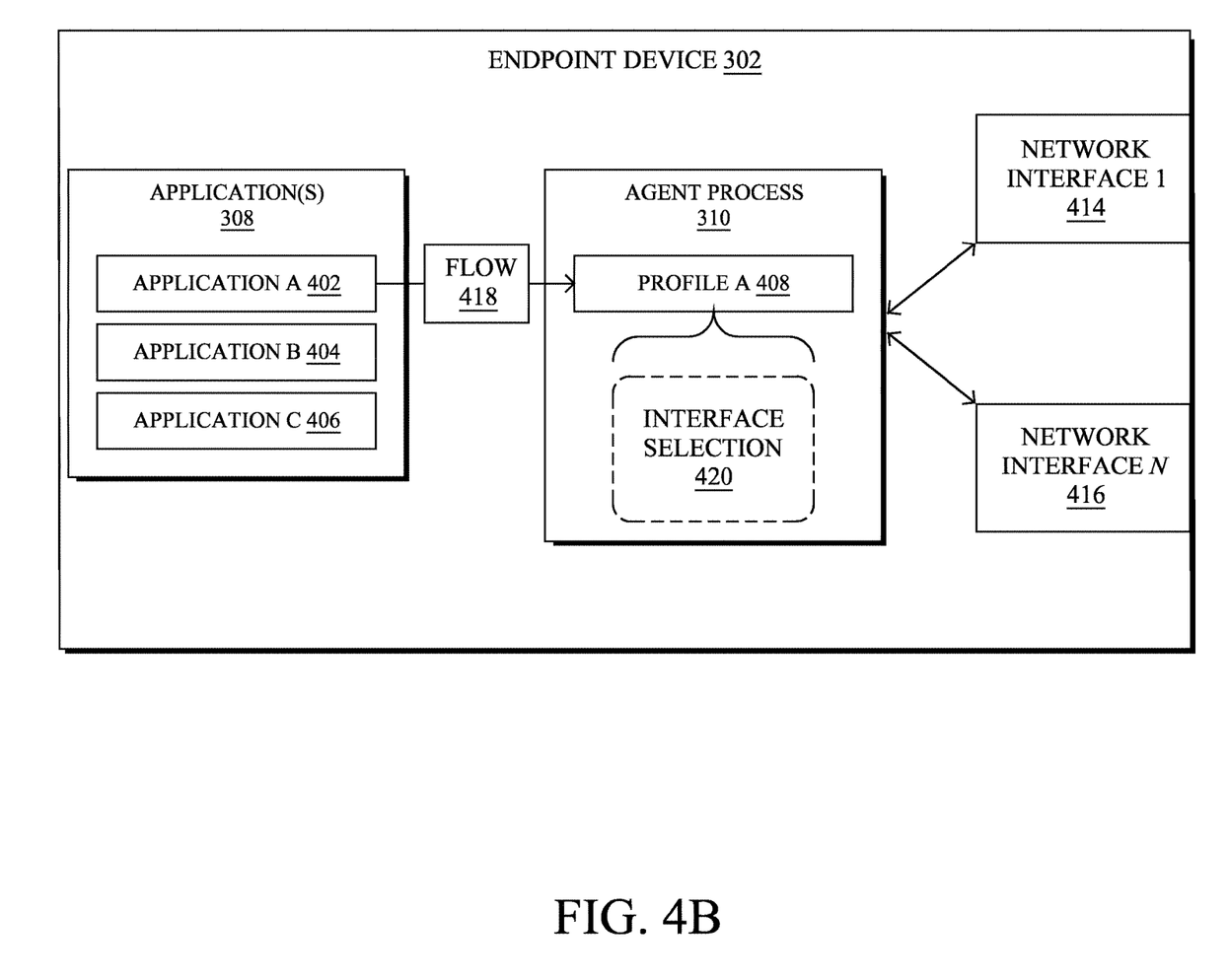

Turning to FIG. 4B, first application 402 may in its operation cause packet flow 418 to be generated by endpoint device 302, where packet flow 418 is then intercepted by agent 310. Agent 310 may then perform an interface selection 420 that determines which network interface (e.g., first networking interface 414 or Nth network interface 416) packet flow 418 is to be sent by. Generally, interface selection 420 may be performed by agent 310 determining which interface selection of those available of endpoint device 302 is the "most" efficient interface providing sufficient QoS and/or QoE for a particular network flow. This determination may be based on a comparison of performance metrics gathered for each of the network interfaces available on endpoint device 302. These metrics may include layer-2 performance metrics, layer-3 performance metrics, etc., which are compared to requirements found in first profile 408 (that corresponds to first application 402).

In an embodiment, a particular network interface may be selected based on an interface i having a highest score S(i) that satisfies the one or more requirements found in an flow profile (retrieved by agent 310) according to the exemplary formula of $S(i)=\Sigma_{k=0}^{n} s_k * w(k)$. In particular w(k) is a weight for a metric k (e.g., requirement defined in a profile). $s_k$ (i) is a score for the metric k that is estimated based on monitoring of an interface i. Generally, such estimates prescribe that a higher value is indicative of it being closer to a requirement required in a flow profile. Further, an interface may be selected by agent 310 when a score for an interface, taking into account costs (in terms of battery reduction, etc.) is "highest" or indicative it matching requirements of a given flow profile.

Figure 4C:
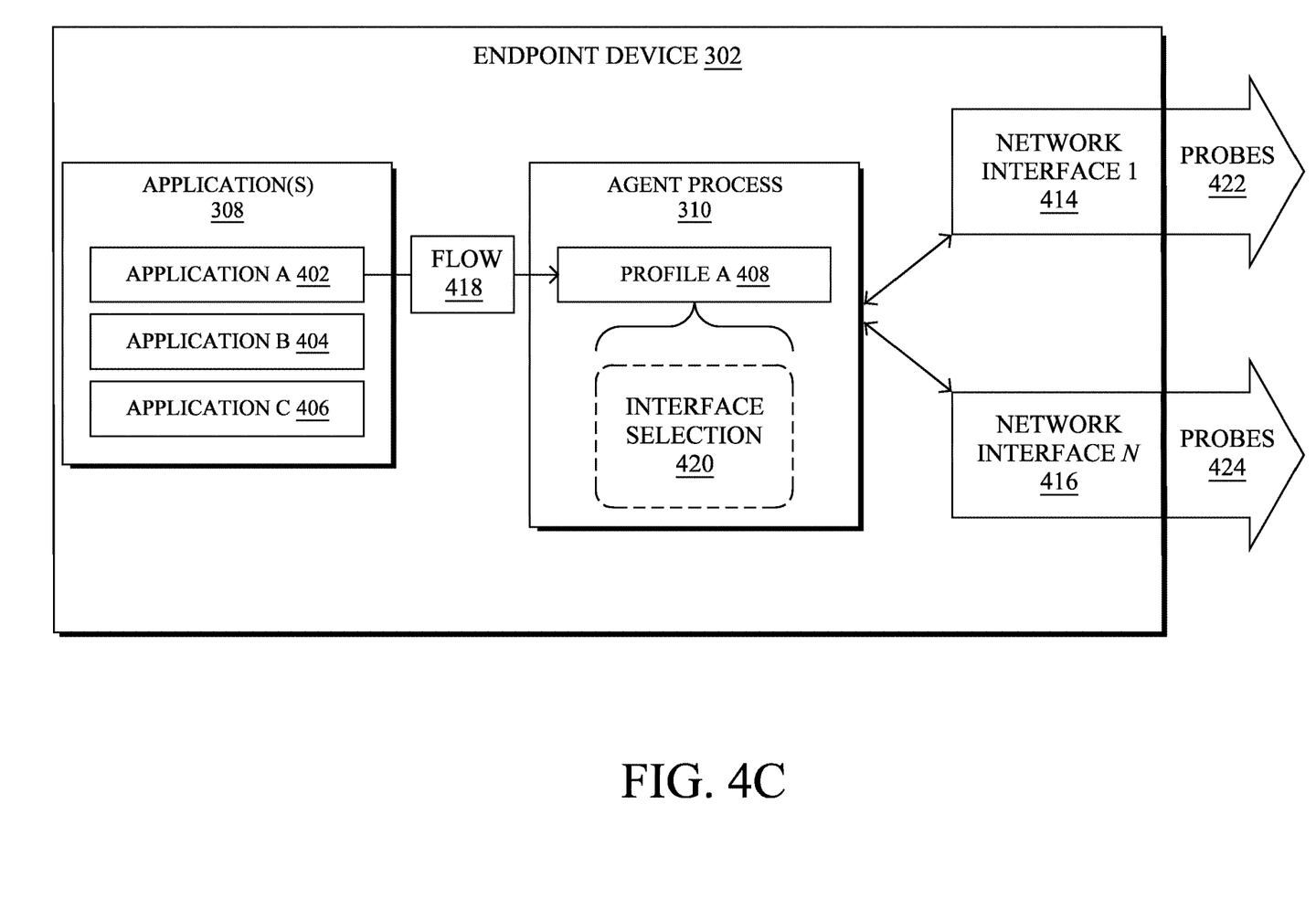

With more particularity regarding performance metrics that may be gathered for a network interface, FIG. 4C illustrates various types of probing that agent 310 may cause to be performed by first networking interface 414 and/or Nth network interface 416. In particular, agent 310 may generally be configured to cause probing to be performed such that the probing is "efficient" and does not overly degrade a device battery life (e.g., probing may be configured to only occur when a device of endpoint device 302 is above a certain threshold). This may be done such that probing only occurs on an active network interface only when layer-2 signals are sufficient (e.g., according to a flow profile). Such probing may include piggybacking network traffic/flows for a particular network interface. Probing may also include probes that are used for improving reliability by sending relevant/useful traffic (e.g., replication traffic, forward error correction (FAC), etc.), where probes are indicated by markers. Of note, probes 422 may be used to assess performance of first networking interface 414, which cause performance signals to be sent and measured (e.g., radio conditions, path congestion, etc.). Probes 424 may be used to assess performance of Nth network interface 416.

Returning to the example shown in FIG. 4B, agent 310 may determine that only first networking interface 414 and network interface 416 have sufficient layer-2 metrics that indicate that network traffic is sufficient. Further, for each of these interfaces, agent 310 may determine a score for these network interfaces, where the score is based on first profile 408. Further, interface selection 420 may include considering resource costs, in terms of battery consumption, data traffic costs, etc. Interface selection 420 by endpoint device 302 may generally include selection an interface that has a higher interface score with a lowest resource cost. In particular, endpoint device 302 may be configured to activate or select an interface that has a greater resource cost only if selection of that interface minimizes degradation of other active network flows from application(s) 308.

Figure 4D:
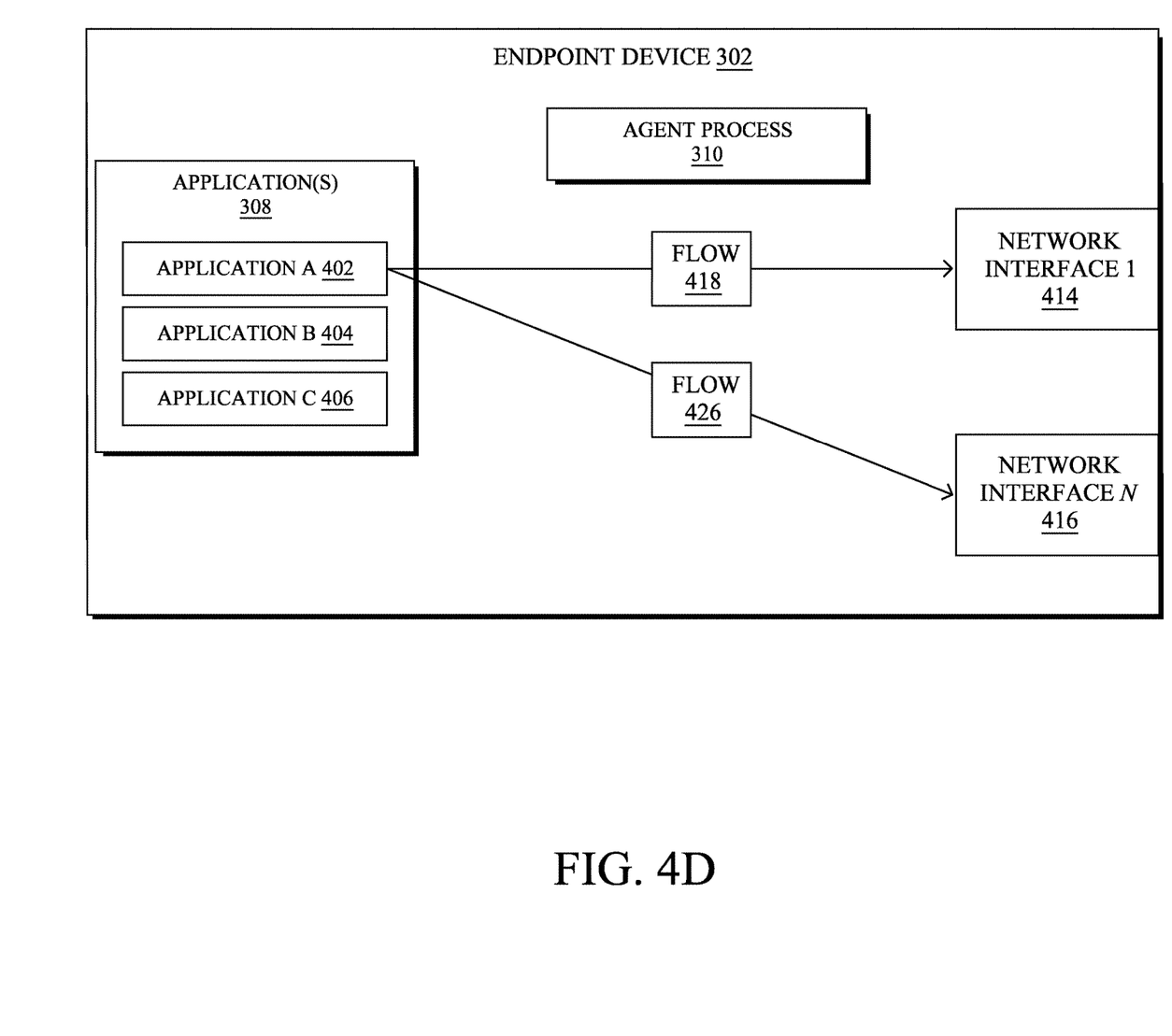

As shown in FIG. 4D, agent 310 may determine that packet flow 418 is to be sent over first networking interface 414 after determining that a score and resource costs are optimized (according to first profile 408). In addition, FIG. 4D illustrates how even for a single application, for example, first application 402, network flows may be differentially sent using different network interfaces. In particular, as described above, packet flow 418 may be sent over first networking interface 414 after determining that a score and resource costs are optimized (according to first profile 408). Different packet flow 426, from the same application, may be sent over Nth network interface 416, according to second profile 410 (based on agent 310 determining that this configuration is more in line and optimized with requirements of first profile 408). In this example, packet flow 418 may comprise higher priority traffic that is more time-sensitive (e.g., real-time interaction of a user of endpoint device 302 with a destination), while different packet flow 426 may comprise lower priority traffic (e.g., text-based communication in the same application).

Figure 4E:
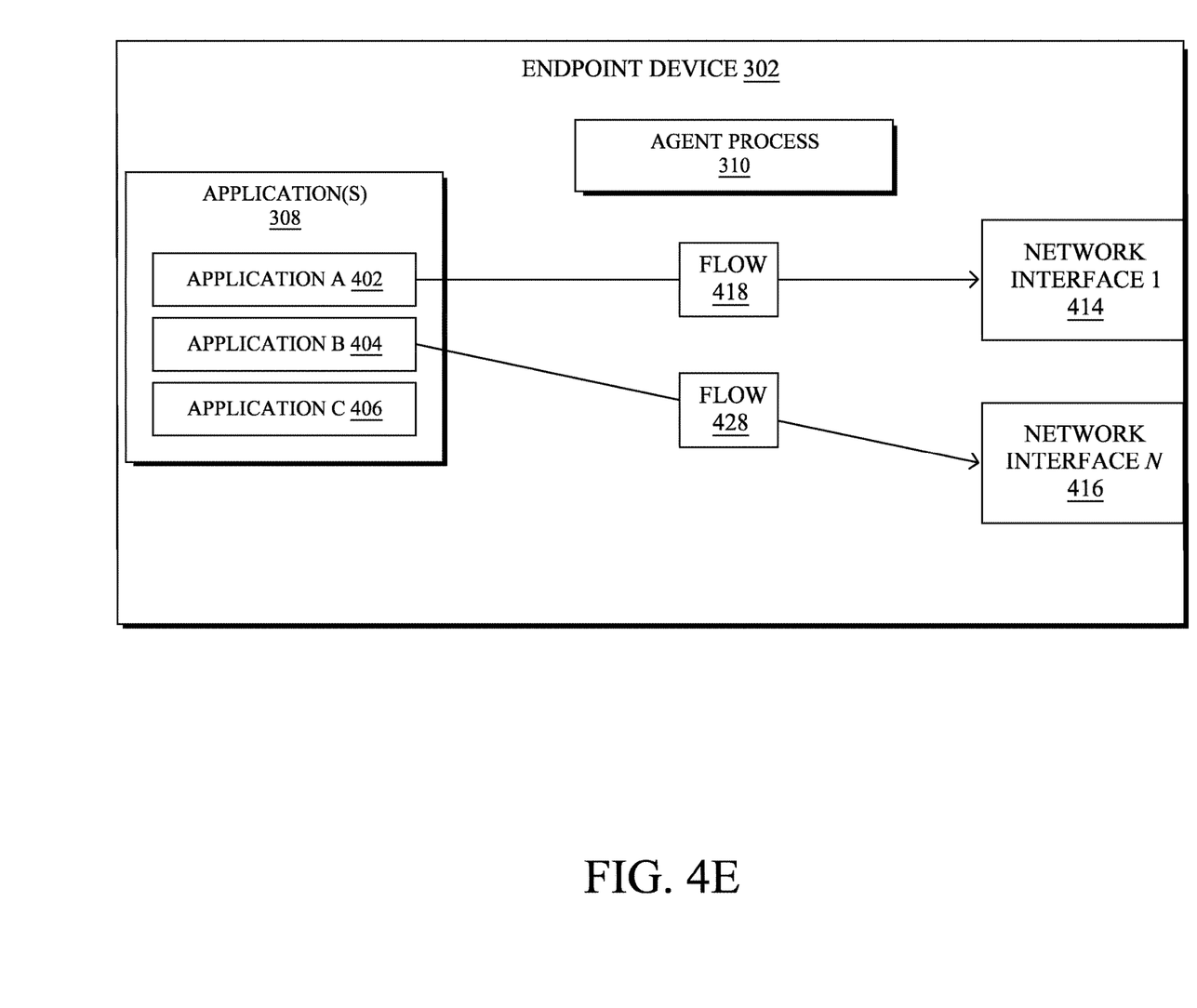

FIG. 4E illustrates how another packet flow 428 of second application 404, agent 310 may determine that sending packet flow 428 using Nth network interface 416 is more optimized, according to second profile 410. In this example, packet flow 428 may comprise traffic associated with higher guarantees of delivery/security (e.g., voice or video chat), while different packet flow 426 may comprise lower priority traffic (e.g., text-based communications).

Figure 5:
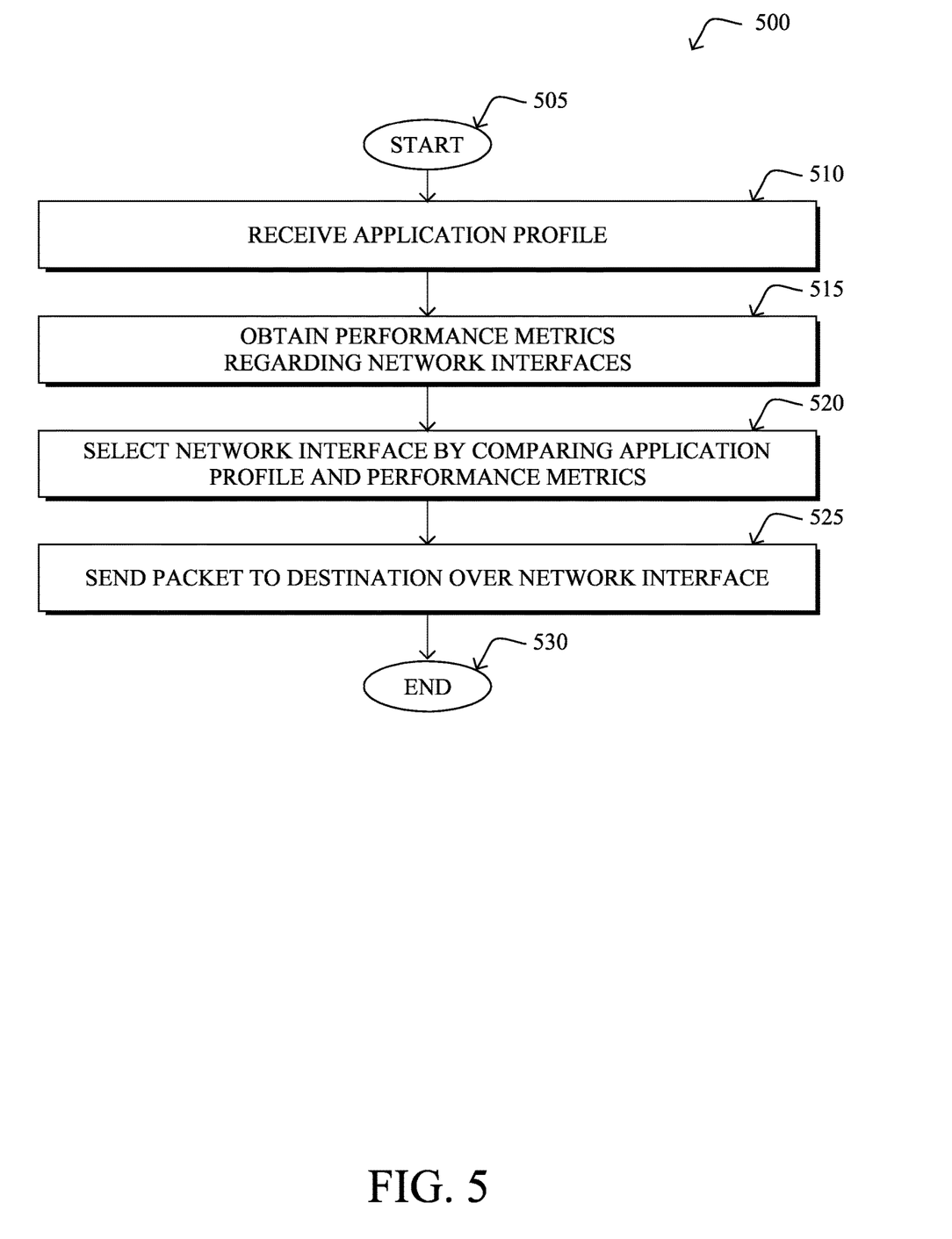
FIG. 5 illustrates an example simplified procedure for network interface selection based on application profiles.

FIG. 5 illustrates an example simplified procedure (e.g., a method) for network interface selection based on application profiles, in accordance with one or more embodiments described herein. For example, a non-generic, specifically configured device (e.g., device 200), may perform procedure 500 by executing stored instructions (e.g., network interface selection agent process 248). The procedure 500 may start at step 505, and continues to step 510, where, as described in greater detail above, an agent executed by an endpoint device may receive a profile for an application executed by the endpoint device that specifies one or more flow treatment policies for the application. In an embodiment, the profile for the application may include one or more Quality of Service requirements. In a further embodiment, the one or more Quality of Service requirements may be translated from one or more Quality of Experience requirements. It is contemplated that, in an embodiment, the agent may be configured to retrieve the profile for the application in response to determining that the application has been installed on the endpoint device.

At step 515, as detailed above, the agent may obtain performance metrics regarding a plurality of network interfaces of the endpoint device. In an embodiment, the obtaining the performance metrics regarding the plurality of network interfaces of the endpoint device may comprise the agent actively probing one of the plurality of network interfaces. In one or more embodiments, the performance metrics may comprise layer-2 or layer-3 performance metrics.

At step 520, the agent may select a particular network interface of the plurality of network interfaces by comparing the profile for the application to the performance metrics. In an embodiment, selecting the particular network interface of the plurality of network interfaces may be based on the particular network interface having an optimal score. In a further embodiment, selecting the particular network interface of the plurality of network interfaces may be further based on the particular network interface having a minimum resource cost.

At step 525, as detailed above, the agent may send a packet for an application flow of the application over the particular network interface. In an embodiment, the agent may another application flow associated with a different application over a network interface of the plurality of network interfaces that is different than the particular network interface. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism for network interface selection based on application profiles. That is, a local agent may be executed along with or as part of an application of the device, so as to provide optimal network interface (e.g., LTE or Wi-Fi) selection on per-application or even a per-network flow (even from a same application) basis according to one or more profiles. In particular, one or more applications executing on a mobile device may be configured to define its own requirements in terms of Quality of Service (QoS) or Quality of Experience (QoE), for example, using a corresponding profile stored in a cloud computing environment. Based on the requirements of an application and monitored performance of network interfaces available on the endpoint device, a particular interface may be selected and used for a given packet/network flow of the application.

While there have been shown and described illustrative embodiments that provide network flow differentiation using a local agent, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well. In addition, while certain types of network packets, protocols, etc. are discussed herein, the techniques herein may be used in conjunction with any network packets, protocols, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    retrieving, by an agent executed by an endpoint device and in response to determining that an application has been installed on the endpoint device, a profile from the application when executed by the endpoint device that specifies one or more flow treatment policies for the application;
    obtaining, by the agent, performance metrics regarding a plurality of network interfaces of the endpoint device by probing one or more of the plurality of network interfaces;
    selecting, by the agent, a particular network interface of the plurality of network interfaces by comparing the profile for the application to the performance metrics;
    sending, by the agent, a packet for an application flow of the application over the particular network interface; and
    sending, by the agent and based on a second profile for a different application, a packet for an application flow of the different application over a network interface of the plurality of network interfaces that is different than the particular network interface.

2. The method as in claim 1, wherein the profile for the application includes one or more Quality of Service requirements.

3. The method as in claim 2, wherein the one or more Quality of Service requirements are translated from one or more Quality of Experience requirements.

4. The method as in claim 1, wherein the performance metrics comprise layer-2 or layer-3 performance metrics.

5. The method as in claim 1, wherein selecting the particular network interface of the plurality of network interfaces is based on the particular network interface having an optimal score that is calculated according to a resource consumption of the particular network interface.

6. The method as in claim 5, wherein selecting the particular network interface of the plurality of network interfaces is further based on the particular network interface having a minimum resource cost among the plurality of network interfaces.

7. The method as in claim 1, wherein the endpoint device comprises a mobile device.

8. An apparatus, comprising:
    one or more interfaces;
    a processor coupled to the one or more interfaces and configured to execute one or more processes; and
    a memory configured to store a process that is executable by the processor, the process when executed configured to:
        retrieve, by an agent executed by the apparatus and in response to determining that an application has been installed on the apparatus, a profile from the application when executed by the apparatus that specifies one or more flow treatment policies for the application;
        obtain, by the agent, performance metrics regarding a plurality of network interfaces of the apparatus by probing one or more of the plurality of network interfaces;
        select, by the agent, a particular network interface of the plurality of network interfaces by comparing the profile for the application to the performance metrics;
        send, by the agent, a packet for an application flow of the application over the particular network interface; and
        send, by the agent and based on a second profile for a different application, a packet for an application flow of the different application over a network interface of the plurality of network interfaces that is different than the particular network interface.

9. The apparatus as in claim 8, wherein the profile for the application includes one or more Quality of Service requirements.

10. The apparatus as in claim 9, wherein the one or more Quality of Service requirements are translated from one or more Quality of Experience requirements.

11. The apparatus as in claim 8, wherein the performance metrics comprise layer-2 or layer-3 performance metrics.

12. The apparatus as in claim 8, wherein to select the particular network interface of the plurality of network interfaces is based on the particular network interface having an optimal score that is calculated according to a resource consumption of the particular network interface.

13. The apparatus as in claim 12, wherein to select the particular network interface of the plurality of network interfaces is further based on the particular network interface having a minimum resource cost among the plurality of network interfaces.

14. A tangible, non-transitory, computer-readable medium storing program instructions that cause an endpoint device to execute a process comprising:
- retrieving, by an agent executed by the endpoint device and in response to determining that an application has been installed on the endpoint device, a profile from the application when executed by the endpoint device that specifies one or more flow treatment policies for the application;
- obtaining, by the agent, performance metrics regarding a plurality of network interfaces of the endpoint device by probing one or more of the plurality of network interfaces;
- selecting, by the agent, a particular network interface of the plurality of network interfaces by comparing the profile for the application to the performance metrics;
- sending, by the agent, a packet for an application flow of the application over the particular network interface; and
- sending, by the agent and based on a second profile for a different application, a packet for an application flow of the different application over a network interface of the plurality of network interfaces that is different than the particular network interface.

* * * * *

UNITED STATES PATENT AND TRADEMARK OFFICE
CERTIFICATE OF CORRECTION

| | | |
|---|---|---|
| PATENT NO. | : 12,081,445 B2 | Page 1 of 1 |
| APPLICATION NO. | : 17/670637 | |
| DATED | : September 3, 2024 | |
| INVENTOR(S) | : Jordan François Jean Augé et al. | |

It is certified that error appears in the above-identified patent and that said Letters Patent is hereby corrected as shown below:

In the Specification

Column 9, Line 34 please amend as shown:
correction (FEC), etc.), where probes are indicated by Signed and Sealed this
Third Day of December, 2024

Katherine Kelly Vidal
*Director of the United States Patent and Trademark Office*